US009605628B2

(12) United States Patent
Woodward

(10) Patent No.: US 9,605,628 B2
(45) Date of Patent: Mar. 28, 2017

(54) NON-INVASIVE PNEUMATIC FILTER CLEANING APPARATUS AND METHOD

(71) Applicant: Benjamin Lee Woodward, Woodleaf, NC (US)

(72) Inventor: Benjamin Lee Woodward, Woodleaf, NC (US)

(*) Notice: Subject to any disclaimer, the term of this patent is extended or adjusted under 35 U.S.C. 154(b) by 0 days.

(21) Appl. No.: 14/638,776

(22) Filed: Mar. 4, 2015

(65) Prior Publication Data
US 2015/0252758 A1 Sep. 10, 2015

Related U.S. Application Data

(60) Provisional application No. 61/948,883, filed on Mar. 6, 2014.

(51) Int. Cl.
*B01D 46/00* (2006.01)
*F02M 35/08* (2006.01)
*B01D 41/04* (2006.01)

(52) U.S. Cl.
CPC ........... *F02M 35/086* (2013.01); *B01D 41/04* (2013.01); *B01D 46/0002* (2013.01); *B01D 46/0068* (2013.01); *B01D 46/0075* (2013.01)

(58) Field of Classification Search
CPC ......... F02M 35/086; B01D 46/0075–46/0076; B01D 46/0068; B01D 46/0002; B01D 46/00; B01D 46/0069; B01D 46/0071; B01D 41/00–41/04
USPC .................................. 55/293, 300, 490–519
See application file for complete search history.

(56) References Cited

U.S. PATENT DOCUMENTS

| 3,716,968 | A | * | 2/1973 | Mischke | F02M 35/086 |
| | | | | | 55/294 |
| 3,733,639 | A | | 5/1973 | Timian | |
| 3,874,857 | A | | 4/1975 | Hunt et al. | |
| 4,153,016 | A | | 5/1979 | Hausknecht | |
| 4,836,834 | A | | 6/1989 | Steele | |
| 4,842,624 | A | | 6/1989 | Barton | |
| 4,871,380 | A | * | 10/1989 | Meyers | B01D 46/0005 |
| | | | | | 55/483 |
| 5,143,529 | A | | 9/1992 | Means, Jr. | |
| 5,252,826 | A | | 10/1993 | Kemp | |
| 5,305,493 | A | | 4/1994 | Prenn | |
| 5,322,535 | A | * | 6/1994 | Simms | B01D 41/04 |
| | | | | | 55/294 |

(Continued)

OTHER PUBLICATIONS

Webpage printout of "Filter Blaster" from web.archive.org on Oct. 20, 2013.

(Continued)

*Primary Examiner* — T. Bennett McKenzie
(74) *Attorney, Agent, or Firm* — Nelson Mullins Riley & Scarborough, LLP

(57) ABSTRACT

A filter cleaning apparatus preferably comprises a filter holding assembly, a vibration assembly, and a diffusion delivery module. The filter holding assembly may secure the filter within a cleaning chamber. The vibration assembly may be operatively coupled to the filter holding assembly and may be configured to vibrate the filter. The diffusion delivery module may reciprocate along a longitudinal axis of the filter and deliver cleaning air radially and substantially perpendicular to an interior surface of the filter. The cleaning air may be pulsated to enhance the cleaning effect.

19 Claims, 5 Drawing Sheets

(56) References Cited

U.S. PATENT DOCUMENTS

| | | | |
|---|---|---|---|
| 5,332,448 A | 7/1994 | Phillips | |
| 5,584,900 A * | 12/1996 | Zaiser | B01D 41/04 |
| | | | 55/293 |
| 5,915,439 A | 6/1999 | Zaiser | |
| 6,428,588 B1 | 8/2002 | Holyoak et al. | |
| 7,468,082 B2 | 12/2008 | Gordon | |
| 2001/0035150 A1 | 11/2001 | Daly et al. | |
| 2004/0202045 A1* | 10/2004 | Marazzi | B01F 11/0008 |
| | | | 366/209 |
| 2012/0138104 A1* | 6/2012 | Haynam | B01D 46/0068 |
| | | | 134/33 |
| 2013/0219839 A1 | 8/2013 | Gillingham et al. | |

OTHER PUBLICATIONS

International Search Report and Written Opinion issued on May 27, 2015 in corresponding international application No. PCT/US2015/018896.

Maticon Pty Ltd Website Printout "Air Filter Dry Cleaning Systems NSW," printed from http://users.hunterlink.net.au/~maapbg/ on Feb. 3, 2014.

* cited by examiner

NON-INVASIVE PNEUMATIC FILTER CLEANING APPARATUS AND METHOD

PRIORITY CLAIM

This application claims the benefit of provisional application Ser. No. 61/948,883, filed Mar. 6, 2014, which is relied upon and incorporated herein by reference for all purposes.

FIELD OF THE INVENTION

The present invention relates to cylindrically shaped, hollow air filters. More particularly, the present invention relates to an apparatus and method for cleaning such filters for reuse.

BACKGROUND

Air filters are in widespread use on the engines of various machines, such as lawn mowers, trucks, and heavy equipment such as tractors, bulldozers, track hoes, etc. These air filters are used to remove dust, dirt, and other particulates from the engine intake air. This reduces the amount of abrasive particulate material that enters the engine, which may otherwise cause mechanical wear and oil contamination.

As one skilled in the art will recognize, air filters for combustion engines are typically hollow, cylindrically shaped, frames containing a porous paper, foam, or cotton fabric disposed thereon. The engine draws combustion air from the external environment through the air filter, which removes particulates and contaminants so that only clean air is left for the combustion process. However, as the particulates build up on the surface of the air filter, filter performance may decline. For example, excess particulate matter may clog the air filter, thereby decreasing the intake of fresh air for the combustion process and restricting engine performance. In addition, excess particulate matter may deform the filter, cause rapid deterioration, or result in punctures in the filter, which may result in harmful particulate matter reaching the engine.

Air filters vary in size and expense, and although these filters are usually not intended to be reused, filter replacement cost can be high, especially on larger, industrial-size vehicles and equipment. Filter replacement may result in significant costs over the life of a machine. It is therefore desirable to reduce this cost by providing a non-invasive pneumatic filter cleaning apparatus for cleaning dirty filters so that they may be reused.

SUMMARY

Example embodiments of the present invention recognize and address considerations of prior art constructions and methods.

In accordance with an example embodiment, the present invention provides a novel apparatus and method for cleaning a cylindrical hollow air filter using compressed air. The apparatus preferably includes a cleaning chamber in which the filter is secured for cleaning. Compressed air is introduced in reverse of that which brought contaminants into the filter when it was blocking these contaminants from entering the engine. Preferably, the apparatus operates automatically, such as using a suitably programmed PLC (programmable logic controller) in order to effect the cleaning operation.

According to an example embodiment, a filter cleaning apparatus is provided comprising a filter holding assembly, a vibration assembly, and a diffusion delivery module. The filter holding assembly may secure the filter within a cleaning chamber. The vibration assembly may be operatively coupled to the filter holding assembly and may be configured to vibrate the filter. The diffusion delivery module may reciprocate along a longitudinal axis of the filter and deliver cleaning air over a substantially 360° angle and substantially perpendicular to an interior surface of the filter. In addition, or alternatively, the cleaning air may be pulsated to enhance the cleaning effect.

In some embodiments, the diffusion delivery module may comprise a diffusion pipe that terminates in a 360° diffusion nozzle, the diffusion nozzle comprising a machined block with concave inner structure and a disk-shaped diffusion cap for delivering the cleaning air toward the filter. The vibration assembly may comprise a cam shaft motor which drives a cam shaft and cam actuators, the cam actuators engaging a rocker arm and push rod arrangement to vibrate the filter.

According to another example embodiment, the filter holding assembly may comprise a spring loaded bottom support plate and a top support plate operatively coupled to a vibration plate by the vibration assembly. A photo eye or other appropriate sensor may be included to detect the deflection of the spring loaded bottom support plate and indicate pressure placed on the air filter.

According to some embodiments, a vacuum system can be used to remove and dislodge particulate matter from the filter. In addition, a vacuum air sensor may be used for monitoring performance of the filter cleaning apparatus. A retracting skirt may be included for retaining dirt and debris that is dislodged from the filter during the cleaning process.

According to another example embodiment, a method of cleaning a filter using a filter cleaning apparatus may be provided. The method may comprise the steps of securing the filter in a cleaning chamber, vibrating the filter using a vibration assembly, and providing a diffusion delivery module for delivering cleaning air to an interior surface of the filter. In some embodiments, the cleaning air may be pulsating, compressed air that is delivered over a substantially 360° angle to the interior surface of the filter. In addition the diffusion delivery module may be reciprocated along a longitudinal axis of the filter and contaminants that are dislodged from the filter may be vacuumed from the cleaning chamber.

In some embodiments, the method may further comprise the step of detecting the deflection of a spring loaded bottom support plate using a photo eye sensor and determining the amount of pressure placed on the filter. Alternatively, or in addition, the method may include the step of monitoring the performance of the filter cleaning apparatus by using a vacuum air sensor to detect airflow and levels of particulate matter being vacuumed from the cleaning chamber.

Those skilled in the art will appreciate the scope of the present invention and realize additional aspects thereof after reading the following detailed description of example embodiments in association with the accompanying drawing figures.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
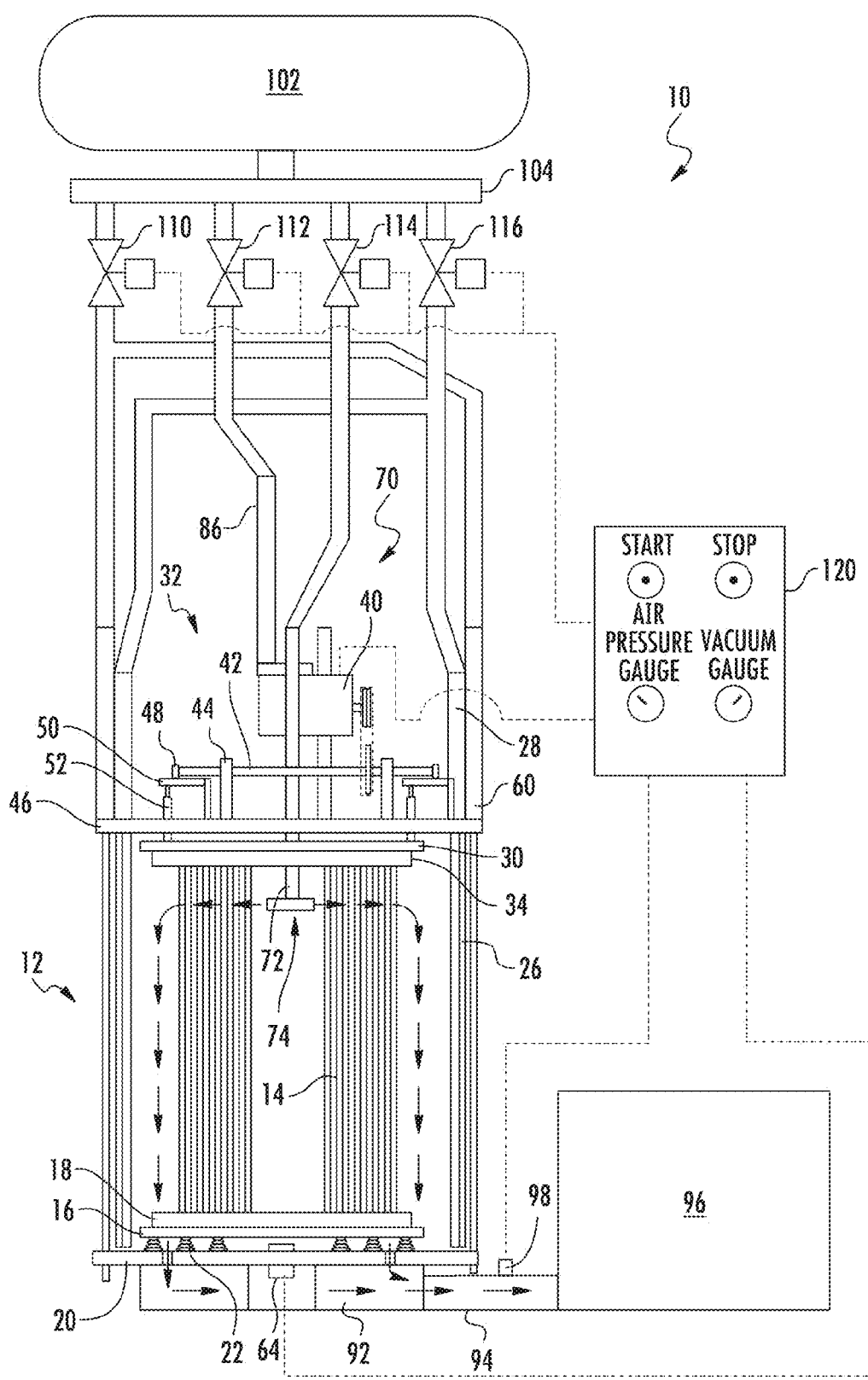
FIG. 1 is a diagrammatic representation showing a non-invasive pneumatic filter cleaning apparatus in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to example embodiments of the present invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations. As used herein, operative coupling should be understood to relate to direct or indirect connection that, in either case, enables functional interconnection of components that are operatively coupled to each other.

Embodiments of the present invention provides a novel apparatus and method for cleaning a cylindrical hollow air filter using a unique combination of one or more of filter vibration, pulsating, compressed air, a reciprocating diffusion delivery module with a 360° nozzle, and a vacuum with a sensor for detecting a clean or damaged filter. In this regard, the apparatus discussed below provides for cleaning a contaminated air filter using a variety of features which synergistically clean the air filter in an efficient, and thorough manner.

FIG. 1 shows a diagrammatic representation of a non-invasive pneumatic filter cleaning apparatus 10 in accordance with an embodiment of the present invention. As can be seen in FIG. 1, a cleaning chamber 12 is configured to receive a filter 14 on a spring holding plate 16. In this regard, the cleaning chamber 12 may be in the form of a generally cylindrical and substantially airtight capsule. However, any container sufficient for housing the filter 14 and the components of the filter cleaning apparatus 10 may also be used. The spring holding plate 16 may comprise a sealing surface, such as a foam rubber pad 18, disposed on its upper surface to provide a seal with the base of the filter 14. In addition, the spring holding plate 16 may be supported from the bottom 20 of the cleaning chamber by a plurality of resilient members, such as conical springs 22. One skilled in the art will appreciate that any other resilient members suitable to resiliently support the spring holding plate 16 may be substituted and remain within the scope of the invention.

Figure 2:
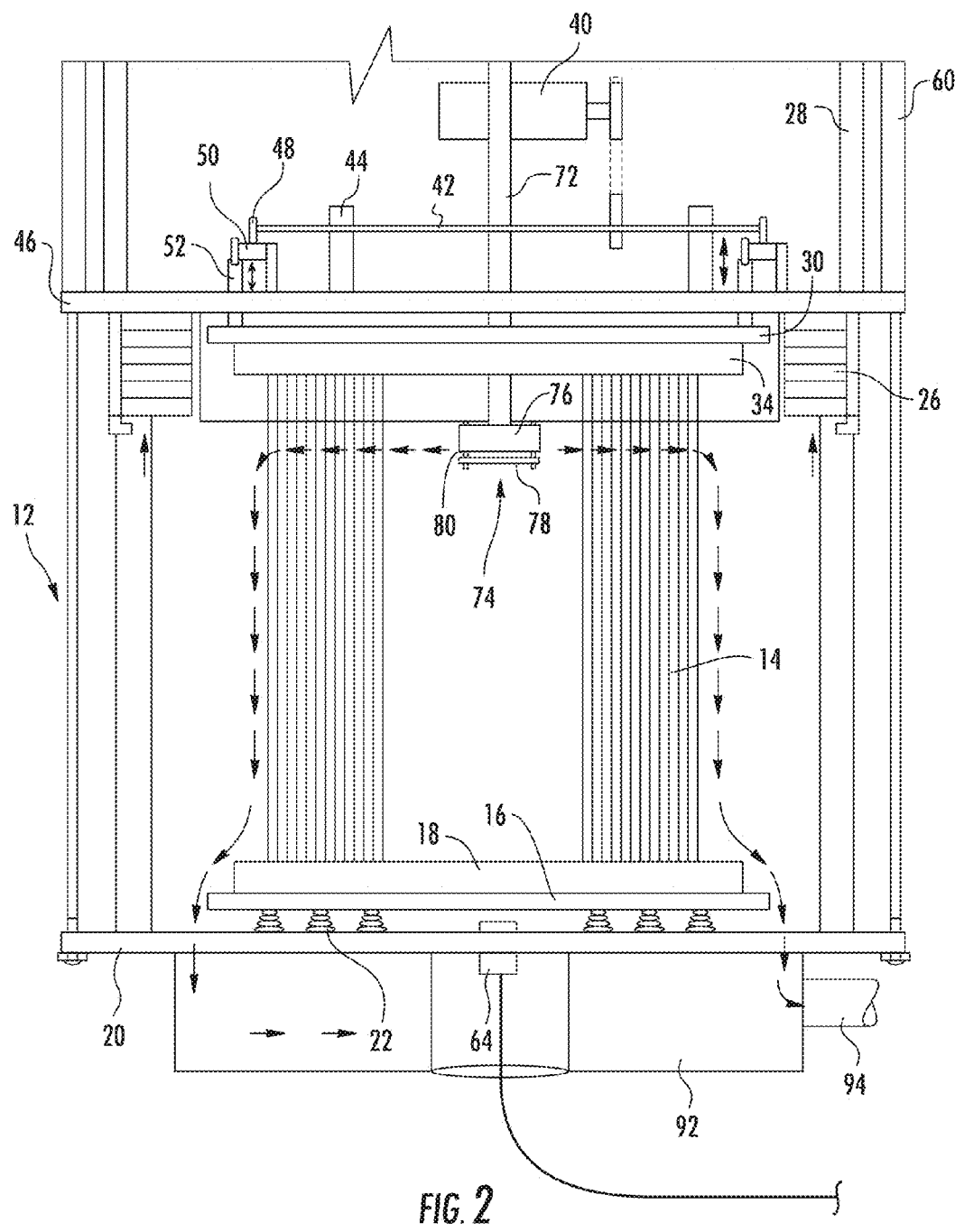
FIG. 2 is an enlarged diagrammatic view of the chamber portion of the apparatus of FIG. 1.

The chamber 12 may further comprise a retracting skirt 26 that encloses the filter 14 to retain dirt and debris that is dislodged during cleaning. In an example embodiment, the retracting skirt 26 may be an accordion style fabric skirt that may retract (as shown in FIG. 2) to allow the filter 14 to be placed in the chamber 12. The retracting skirt 26 may then be extended (as shown in FIG. 1) prior to beginning the cleaning process in order to retain debris. As explained further in detail below, in an example embodiment, the retracting skirt 26 may be actuated by one or more skirt air cylinders 28.

As best shown in FIGS. 1 and 2, the top of filter 14 is secured by a vibrating plate 30 which is operatively coupled to a vibration assembly 32. Similar to the spring holding plate 16, the vibrating plate 30 has a sealing surface, such as a foam rubber pad 34, to provide a seal with the top of the filter 14. According to an example embodiment, the vibration assembly 32 comprises a cam shaft motor 40 that drives a cam shaft 42, which is rotatably supported by bearing blocks 44 extending from the top holding plate 46 of chamber 12. The cam shaft has two or more cam actuators 48 located on the cam shaft 42 which engage a rocker arm 50 and push rod 52 arrangement. During operation, the rocker arm 50 reciprocates as a result of the cam actuators 48. Push rod 52 extends through the top holding plate 46 of chamber 12 and connects to the vibrating plate 30. As the vibrating plate 30 vibrates, the filter 14 vibrates between the spring holding plate 16 and the vibrating plate 30, while the conical springs 22 ensure that the filter 14 is still sealed against foam rubbers pads 18 and 34. In this regard, the cam motor 40 is operatively coupled to the vibrating plate 30 and causes vibration of the filter 14.

In an example embodiment, the chamber 12 is longitudinally extendable, so that it may accommodate filters of various sizes. In this regard, either or both of the chamber bottom 20 or top holding plate 46 may be movable to accommodate the filter. The chamber bottom 20 may move vertically as shown in FIG. 1 such that the spring holding plate 16 and all other system components attached thereto, travel with the chamber bottom 20. In this embodiment, the top holding plate 46 is movable relative to filter 14, and such movement is controlled by a pressure plate air cylinder 60. Once the filter 14 is placed on the spring holding plate 16, the chamber bottom 20 may be moved upward toward the top of the chamber and/or the top holding plate 46 may be moved down toward the chamber bottom 20 to secure the filter 14 for the cleaning process discussed in detail below.

As discussed above, the vibration assembly 32 operatively couples the top holding plate 46 and the vibrating plate 30. Therefore, the entire vibration assembly 32 is moved vertically relative to the filter 14 in order to ensure an appropriate amount of tension is exerted on the filter 14. In this regard, one end of rocker arm 50 is pivotally connected to the top holding plate 46 while the other end of the rocker arm engages the push rod 52. The push rod 52 is connected to the vibrating plate 30. Therefore, the pressure plate air cylinder 60 may be adjusted so that the vibrating plate 30 presses filter 14 down onto the spring holding plate 16 with sufficient force to hold the filter 14 in place without damaging it. In this regard the holding pressure may be measured by a pressure sensor configured to monitor the tension on the spring holding plate 16. For example, in FIGS. 1 and 2, a photo eye sensor 64 may be placed underneath the spring holding plate 16 and may measure the deflection of the spring holding plate 16. In this manner, a holding tension of the filter 14 may be determined, and the pressure plate air cylinder 60 may be adjusted to ensure proper holding, but not damaging, tension is exerted.

Figure 3:
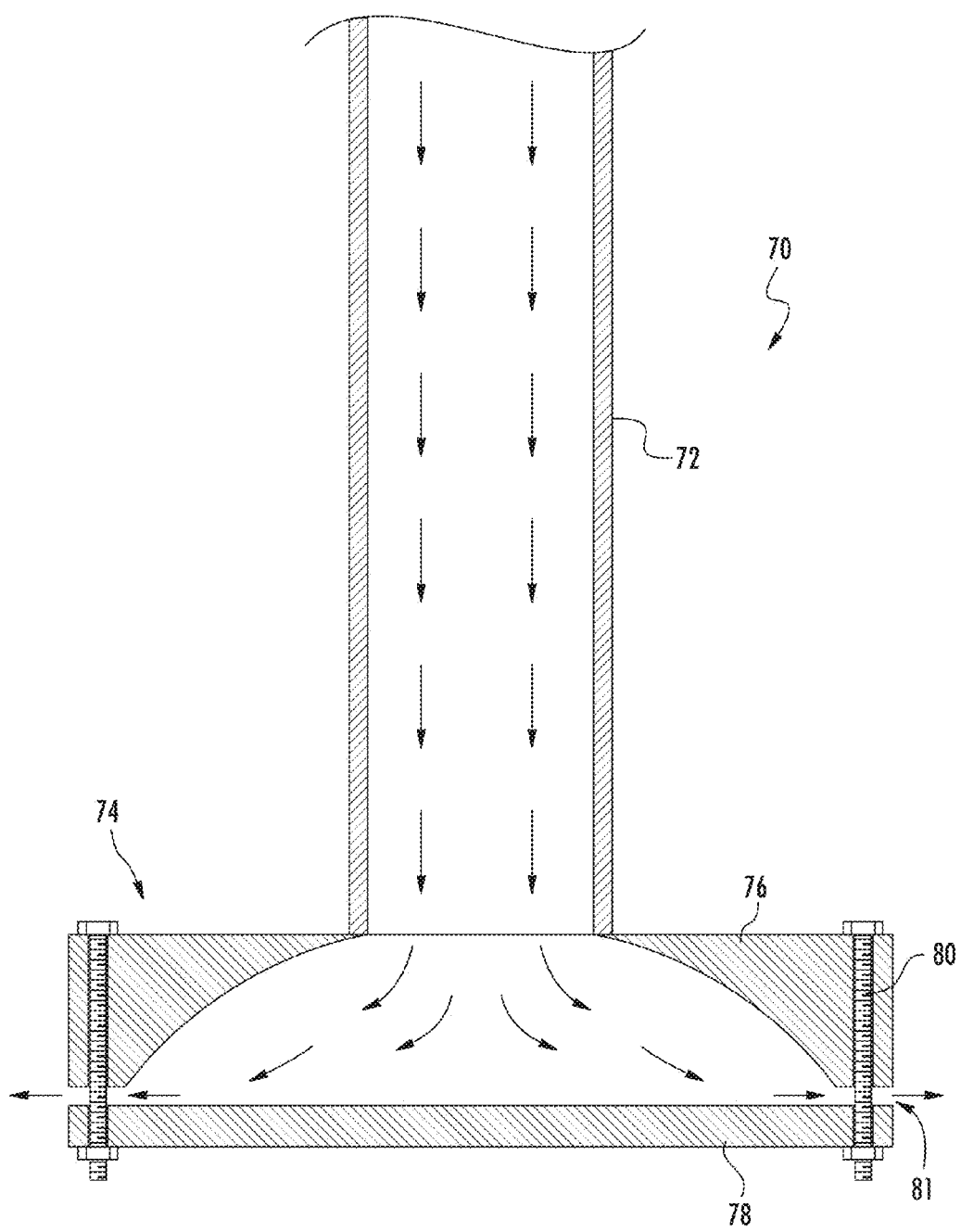
FIG. 3 is an enlarged diagrammatic view of the diffusion delivery module shown in FIGS. 1 and 2.

In an example embodiment, a diffusion delivery module 70 is configured to deliver the cleaning air to the interior surface of the cylindrical air filter 14. The diffusion delivery module comprises a diffusion pipe 72 that is inserted into the center of filter 14 through a hole in the top holding plate 46 and vibrating plate 30. The diffusion pipe 72 may be, for example, a hollow, cylindrical chromed tube which projects downward into the hollow space inside the air filter 14 being cleaned. The diffusion pipe 72 terminates in a deflector plate (e.g., nozzle) 74 that deflects the cleaning air radially toward the interior surface of the filter media. In an example embodiment, described in reference to FIG. 3, the deflector plate 74 comprises a diffusion element 76 in the form of a machined block with a concave inner structure and a diffusion cap 78. The diffusion cap 78 may be connected to the diffusion element 76 by shimmed bolts 80. Cleaning air may flow from the diffusion pipe 72 and through an opening 81 in the diffusion element 76, where it is diffused and redirected toward the air filter 14. In the preferred embodiment, the cleaning air is deflected substantially 360° such that it cleans an entire circumferential area of the filter 14 at a given time.

Now referring back to FIGS. 1 and 2, the diffusion delivery module 70 is configured to reciprocate along the longitudinal axis of the cylindrical air filter 14. This reciprocation allows the entire inner surface of the air filter 14 to be blasted with cleaning air. In this embodiment, reciprocation of the diffusion pipe 72 may be achieved by a diffusion module air cylinder 86. As the diffusion pipe 72 is reciprocated within the filter 14, the cleaning air is delivered to the diffusion delivery module 70. In a preferred embodiment, the cleaning air may be pulsated by virtue of a solenoid and pulsating valve, as described in more detail below.

Figure 4A:
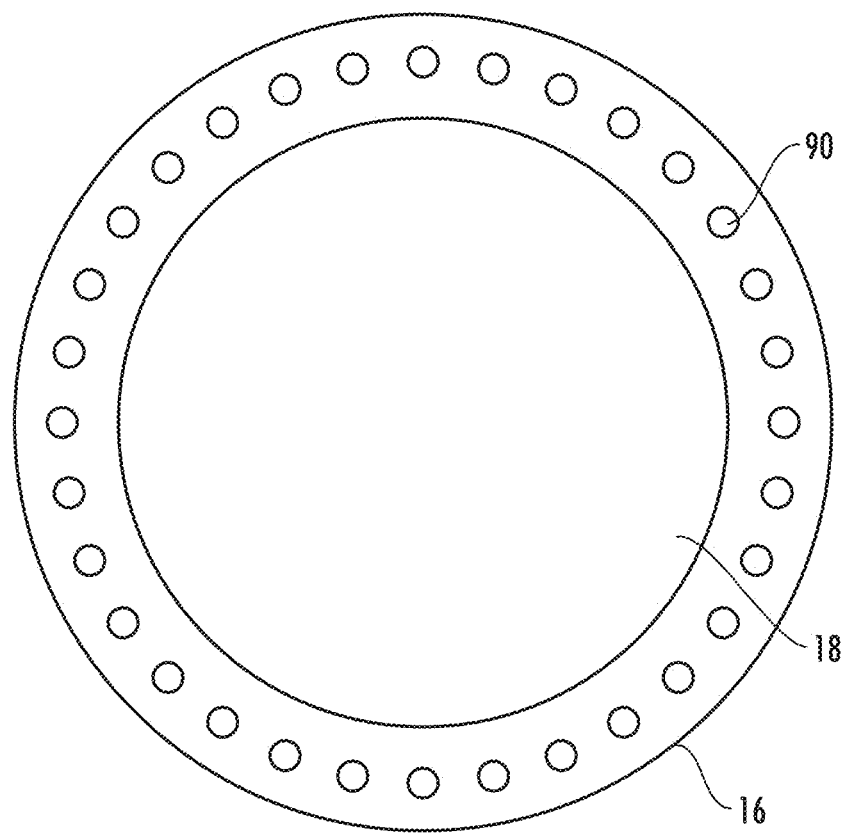
FIG. 4A is a top view of the spring holding plate in accordance with an example embodiment.
Figure 4B:
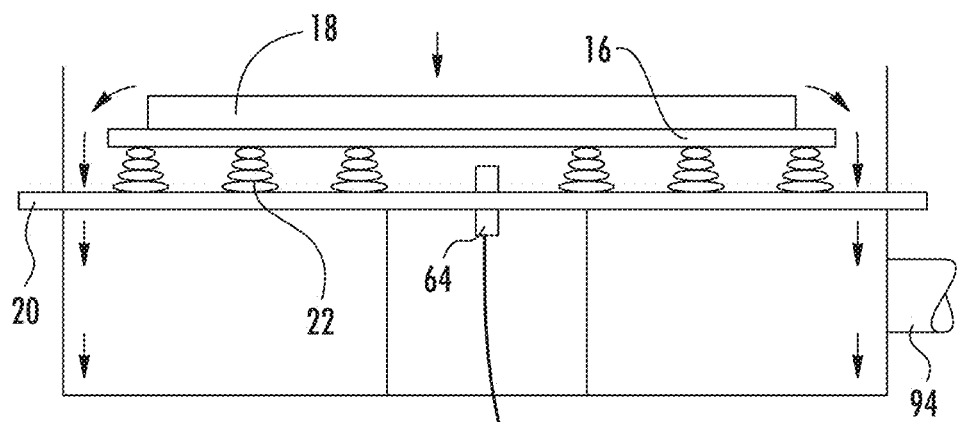
FIG. 4B is a diagrammatic view showing details of an exemplary spring holding plate in the chamber portion of FIG. 2.

As a result of the vibration of the filter 14 and the pulsating air being delivered by the reciprocating diffusion delivery module 70, effective cleaning of the filter 14 is achieved. As the air flows from inside the cylindrical filter 14 to the outside, dirt, debris, and particulates that have been dislodged are projected away from the filter 14. The retracting skirt 26 is in its extended position, so all of the particulates are retained and fall down toward the spring holding plate 16. As shown in FIG. 4A, the spring holding plate 16 preferably has a series of holes 90 which allow the dirt to fall or be sucked into a vacuum chamber 92, which is positioned below the chamber bottom 20. Referring back to FIG. 1, a vacuum hose 94 is connected to the vacuum chamber 92, and a vacuum source (e.g., vacuum cleaner) 96 removes the debris and stores it in an emptying bin. In addition, a vacuum air sensor 98 may be positioned on the vacuum hose 94, or anywhere else along the vacuum path, in order to monitor the cleaning process. For example, the vacuum air sensor 98 may monitor vacuum airflow intensity to detect any clogs in the vacuum system or determine whether the filter has been damaged. The vacuum air sensor 98 may also be configured to detect the levels of particulate matter in the vacuum air, and thus provide an indication of the cleanliness of the filter 14.

The control and operation of the air cylinders will now be discussed in detail with reference to FIG. 1. In this embodiment, the air supply system comprises an air holding tank 102, a distribution manifold 104, and a series of solenoid valves which correspond with the various air cylinders used to operate the filter cleaning apparatus 10. Although the discussion herein refers to individual air cylinders for controlling the various aspects of the filter cleaning apparatus 10, one skilled in the art will appreciate that multiple air cylinders may be used, for example, to provide more uniform force upon a surface. Discussion of air cylinders in the singular is only used for simplicity of discussion, and the configuration of the invention need not be so limited. In addition, one skilled in the art will recognize that other means of achieving linear movement that are capable of performing functions similar or equivalent to air cylinders may also be used.

In the example embodiment shown in FIG. 1, pressure plate valve 110 may be opened to apply pressure to the pressure plate air cylinder(s) 60. In this regard, the chamber 12 may be opened to allow for the insertion of a contaminated filter 14 and may then be closed prior to cleaning. The air pressure applied to the pressure plate air cylinder 60 may be carefully controlled to ensure the desired filter holding pressure is achieved. A diffusion delivery module valve 112 may be opened to cause air cylinder 86 to reciprocate the diffusion delivery module 70 by, for example, moving the diffusion pipe 72 reciprocally along a longitudinal axis of the filter 14. While the diffusion pipe 72 is reciprocating in the filter 14, clean air valve 114 may be used to provide cleaning air to the diffusion delivery module 70. In a preferred embodiment, this clean air valve 114 is cycled on and off repeatedly such that the cleaning air is pulsated for enhanced cleaning. Retracting skirt valve 116 may be opened and closed as necessary to extend and retract the retracting skirt 26.

In the example embodiment of FIG. 1, a control panel 120 may control the entire operation of the filter cleaning apparatus 10 in an automated manner. For example, the control panel 120 may include a programmable controller, such as a programmable logic controller (PLC) module, which may be used to automate operation of the filter cleaning apparatus 10. Alternatively, control panel 120 may comprise any other computing means sufficient to control the operation of the filter cleaning apparatus 10 in the desired manner. For example, the controller may be any type of various processing means, such as a microprocessor, and may include instructions stored, for example, in a memory storage device. The controller may comprise a processor configured to execute instructions stored in the storage device or otherwise accessible to the processor. As such, whether configured by hardware or software methods, or by a combination thereof, the processor may represent an entity (e.g., physically embodied in circuitry) capable of performing operations according to embodiments of the present invention while configured accordingly.

As one skilled in the art will appreciate, some or all of the following procedures are preferably processed automatically through PLC computer logic: closing the chamber and extending the retracting skirt; determining the proper filter tension inside the chamber; injecting compressed air into the diffusion delivery module; activating pulsating action of injected air; activating reciprocating action of the diffusion delivery module; activating the vibrating motor; and/or activating the vacuum.

In a preferred embodiment, the filter cleaning apparatus 10 may be completely enclosed in a standalone cabinet. This cabinet may include, for example, an air compressor and air holding tank, a detachable vacuum cleaner, and an integrated power source and control panel. In this regard, the filter cleaning apparatus 10 may be entirely mobile and may be easily transported to provide a filter cleaning service or may remain stored on or near engines that frequently need their filters cleaned. Alternatively, the components may be separated and may be placed in a more permanent environment. In some applications, the air holding tank and compressor may not be needed, as compressed air may be obtained from a manufacturing plant infrastructure, for example. In addition, a central vacuum system may be employed instead of a standalone, portable vacuum cleaner. Other modifications and configurations are also contemplated.

Figure 5:
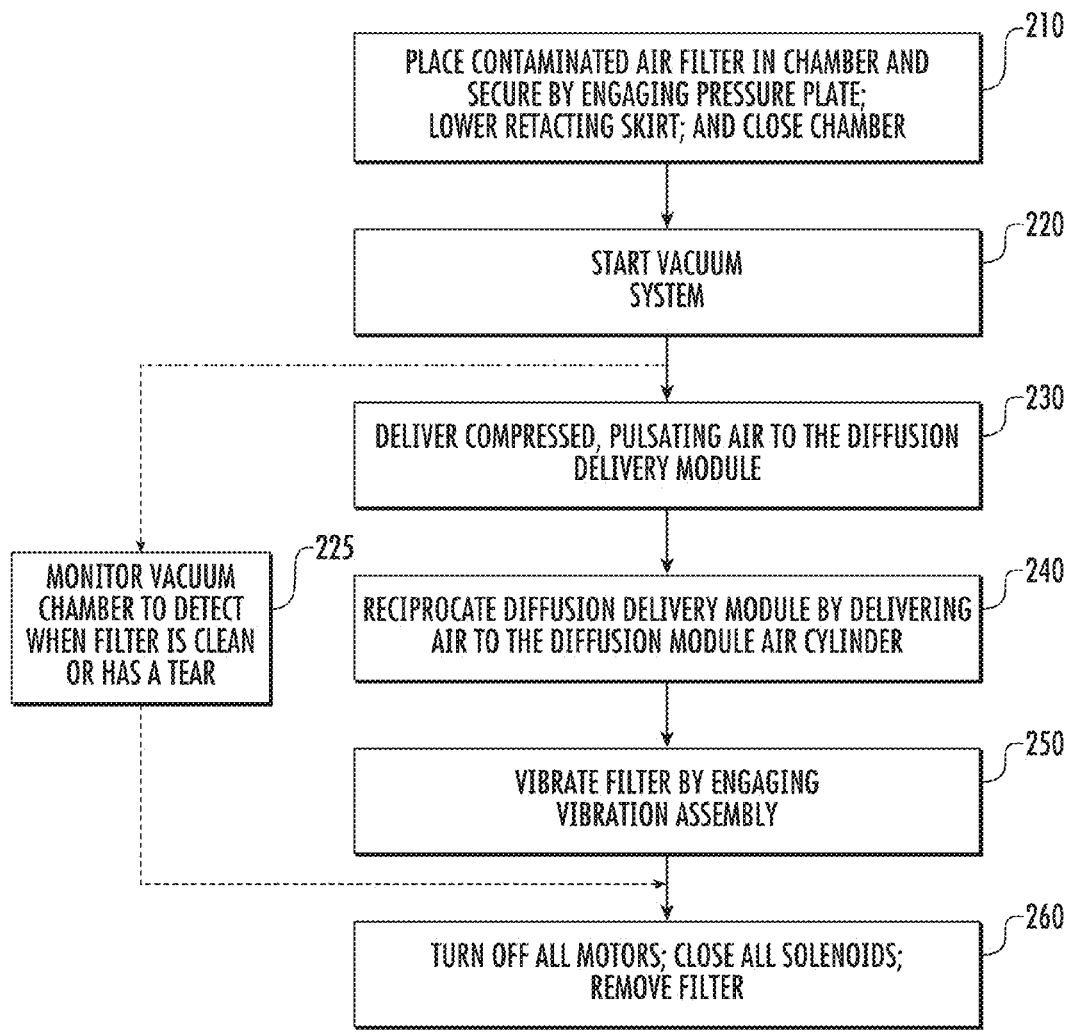
FIG. 5 is a flow chart showing a method for cleaning a filter using a filter cleaning apparatus according to an example embodiment.

Now that the structure of the apparatus has been described, a preferred manner of operation will be discussed in reference to FIG. 5. At step 210, a contaminated air filter 14 is placed in chamber 12 and secured for cleaning. In this regard, the base of the filter 14 is placed on the foam rubber pad 18 on top of the spring holding plate 16. The control panel 120 opens valve 110 and regulates the air pressure delivered to the pressure plate air cylinder 60. The pressure plate air cylinder 60 is operatively coupled to the vibrating plate 30 through the vibration assembly 32, such that the foam rubber pad 34 on the vibrating plate 30 presses down on filter 14. The pressure placed on the filter 14 may be detected by the photo eye sensor 64, as discussed above, so that an appropriate amount of pressure is applied to the filter 14 to secure it in place while not applying so much pressure that the filter 14 may be damaged. By engaging the pressure plate air cylinder 60 with the top holding plate 46 as discussed above, the contaminated filter 14 is secured inside a cylindrical chamber 12 and held in place with regulated air pressure such that appropriate pressure is applied and the top and bottom portions of the filter 14 are sealed against the foam rubber pads 18 and 34. The retracting skirt 26 may then be lowered by opening the retracting skirt valve 116. When step 210 is complete, the filter cleaning apparatus 10 preferably automatically performs five distinct, non-invasive functions that work synergistically and almost simultaneously to provide optimal cleaning without damaging the filter 14 being cleaned.

After the filter 14 is properly secured in the chamber 12 in step 210, the vacuum system is started in step 220. In this regard, the vacuum begins drawing air from the interior of the chamber 12, through holes 90 in the spring holding plate 16, into vacuum chamber 92, and through vacuum hose 94. Notably, this step alone begins to dislodge dust, debris, and other particulate material from the contaminated filter 14. Immediately after the vacuum system is started, at step 225, the vacuum air sensor 98 begins monitoring the cleaning process. In this regard, the vacuum air sensor 98 may monitor the vacuum and airflow intensity, and may terminate the cleaning process if, for example, a tear is detected (resulting in sharp decrease in pressure) or the filter is clean (such that particulate matter is no longer being removed from the filter 14). In this regard, the effectiveness of the filter cleaning operation and the resulting utility of the filter 14 being cleaned are preferably monitored using built-in air flow measuring devices, such as by measuring in cubic feet per minute (CFM) the air flow through the filter 14. These airflow readings may be compared to readings expected with a new filter, or compared with other baseline numbers, and the operator may be informed if the air flow through the filter being cleaned falls into the desired operating range for maximum filter efficiency or if its integrity has been compromised (e.g., a hole has been worn in the paper element) and needs to be discarded. With these built-in monitoring devices, no inspection lights or remote CFM suction tests are required to test the effectiveness of the filter cleaning apparatus 10.

Cleaning air is delivered to the diffusion delivery module 70 at step 230. In this regard, a high volume of compressed air is injected from air holding tank 102 into the diffusion pipe 72. Notably, by injecting cleaning air into the hollow inner core of the filter 14 being cleaned, the apparatus enacts a reverse air flow compared to normal filter operation. Rather than introducing a continuous stream of compressed air down the diffusion pipe 72, the filter cleaning apparatus 10 preferably causes the injected air to pulsate (i.e., switch off and on) such as by way of a clean air valve 114 which delivers pulsating air from the air holding tank 102. The pulsating air bursts intensify the impact of the air being forced down the diffusion pipe 72 and subsequently dispersed onto the inner side of the filter 14 being cleaned.

At step 240, the diffusion delivery module is reciprocated by controlling the diffusion module valve 112. In this regard, the diffusion delivery module 70 is reciprocated up and down from the top to the bottom of cylindrical filter 14 in order to deliver compressed air to the entire interior surface of the filter 14. The diffusion pipe 72 and deflector plate 74 thus travel up and down, top to bottom, inside the hollow core of the contaminated filter 14. In this embodiment, the traveling action is activated and speed regulated by air flow from an external source (i.e., holding air tank 102) through a solenoid (i.e., diffusion module valve 112), and an in-line air cylinder (diffusion delivery module cylinder 86).

As discussed above, the compressed, pulsating air exits the base of the diffusion pipe 72 onto the contaminated elements of the filter 14 being cleaned. In this regard, as cleaning air exits the diffusion pipe 72, and before it impacts the filter 14, it is preferably diffused and dispersed in a substantially 360° fashion such as by deflector plate 74. Thus, the diffusion delivery module 70 focuses air all around but protects the integrity of the filter 14 by avoiding pin hole punctures sometimes caused by direct, in-line injections of forced, compressed air onto sensitive filter fins.

At step 250, the filter 14 is vibrated by engaging vibration assembly 32. In this embodiment, the cam shaft motor 40 turns a cam shaft 42 and cam actuators 48. The cam actuators drive the rocker arm 50 and push rod 52 to vibrate the vibrating plate 30 and filter 14. The control panel 120 may adjust the speed of the cam shaft motor 40 to control the vibration frequency as desired. For example, while the pulsated and diffused air influences the entire inner surface of the filter 14 being cleaned, the filter 14 itself is preferably vibrated in this manner such as by very short, sonic-like impulses. These impulses are of sufficient intensity to dislodge stubborn, clinging particles that injected air alone might not have loosened.

Steps 230 through 250 take place inside the hollow core of the contaminated filter 14 and are intended to force substantially all contaminants captured by the filter 14 back out into the vacuum chamber 12 between the outside of the filter 14 and the inner walls of the chamber 12 or retracting skirt 26. A vacuum system, preferably attached in fluid communication with chamber 92, preferably activates almost simultaneously with steps 230 through 250 to pull these contaminates from the chamber 12 through holes 90 in bottom spring holding plate 16, through a hose 94 and into a self-contained, debris-capturing container. The vacuum action, by its nature, also further assists and enhances the actions of steps 230 through 250. At step 260, once the filter cleaning process is complete (or a tear is detected), all motors are turned off, all solenoids are closed, the skirt is retracted, and the filter 14 may be removed.

While one or more example embodiments of the invention have been described above, it should be understood that any and all equivalent realizations of the present invention are included within the scope and spirit thereof. The embodiments depicted are presented by way of example only and are not intended as limitations upon the present invention as further described in the appended claims. Thus, it should be understood by those of ordinary skill in this art that the present invention is not limited to these embodiments since modifications can be made. In addition, it should be understood that aspects of the various embodiments may be interchanged both in whole or in part. Therefore, it is contemplated that any and all such embodiments are included in the present invention as may fall within the scope and spirit thereof.

The invention claimed is:

1. A filter cleaning apparatus comprising:
   a filter holding assembly for securing the filter within a cleaning chamber wherein the filter holding assembly comprises a bottom support plate, a top support plate and a vibrating plate;
   a vibrator operatively coupled to the filter holding assembly and configured to vibrate the vibrating plate and thus vibrate the filter; and
   a nozzle module that reciprocates along a longitudinal axis of the filter and delivers cleaning air simultaneously over substantially 360° and perpendicular to an interior surface of the filter.

2. The filter cleaning apparatus of claim 1, wherein the bottom support plate is a spring loaded bottom support plate and wherein the bottom support plate and the top support plate are operatively coupled to the vibration plate by the vibrator.

3. The filter cleaning apparatus of claim 2, further comprising a sensor to detect the deflection of the spring loaded bottom support plate and indicate pressure placed on the filter.

4. The filter cleaning apparatus of claim 1, further comprising a vacuum system for removing and dislodging particulate matter from the filter.

5. The filter cleaning apparatus of claim 4, wherein the vacuum system further comprises a vacuum air sensor in fluid communication therewith for monitoring performance of the filter cleaning apparatus.

6. The filter cleaning apparatus of claim 1, wherein the cleaning air is pulsated to enhance the cleaning effect.

7. The filter cleaning apparatus of claim 1, wherein the nozzle module comprises a diffusion pipe that terminates in a 360° diffusion nozzle, the diffusion nozzle comprising a machined block with concave inner structure and a disk-shaped diffusion cap for delivering the cleaning aft toward the filter.

8. The filter cleaning apparatus of claim 1, wherein the vibrator comprises a cam shaft motor which drives a cam shaft and cam actuators, the cam actuators engaging a rocker arm and push rod arrangement to vibrate the filter.

9. The filter cleaning apparatus of claim 1, further comprising a retracting skirt for retaining dirt and debris that is dislodged from the filter during the cleaning process.

10. A filter cleaning apparatus comprising:
    a filter holding assembly for securing the filter within a cleaning chamber wherein the filter holding assembly comprises a bottom support plate, a top support plate and a vibrating plate;
    a vibrator operatively coupled to the filter holding assembly and configured to vibrate the vibrating plate and thus vibrate the filter;
    a nozzle module that reciprocates along a longitudinal axis of the filter and delivers cleaning air to an interior surface of the filter, wherein the diffusion delivery module delivers the cleaning air simultaneously over substantially 360° and perpendicular to the interior surface of the filter; and
    an air source in fluid communication with the diffusion delivery module, the air source including a pulsation mechanism such that the cleaning air is pulsated to enhance the cleaning effect, wherein the pulsation mechanism comprises a solenoid and a pulsating valve.

11. The filter cleaning apparatus of claim 10, wherein the bottom support plate is a spring loaded bottom support plate and wherein the bottom support plate and the top support plate are operatively coupled to the vibration plate by the vibrator.

12. The filter cleaning apparatus of claim 11, further comprising a sensor to detect the deflection of the spring loaded bottom support plate and indicate pressure placed on the filter.

13. The filter cleaning apparatus of claim 10, further comprising a vacuum system for removing and dislodging particulate matter from the filter.

14. The filter cleaning apparatus of claim 13, wherein the vacuum system further comprises a vacuum air sensor in fluid communication therewith for monitoring performance of the filter cleaning apparatus.

15. The filter cleaning apparatus of claim 10, wherein the nozzle module comprises a diffusion pipe that terminates in a 360° diffusion nozzle, the diffusion nozzle comprising a machined block with concave inner structure and a diffusion cap for delivering the cleaning air toward the filter.

16. The filter cleaning apparatus of claim 10, wherein the vibrator comprises a cam shaft motor which drives a cam shaft and cam actuators, the cam actuators engaging a rocker arm and push rod arrangement to vibrate the filter.

17. A method of cleaning a filter using a filter cleaning apparatus, the method comprising the steps of:
    securing the filter in a cleaning chamber of the filter cleaning apparatus with a filter holding assembly, wherein the filter holding assembly comprises a bottom support plate, a top support plate and a vibrating plate;
    vibrating the filter using a vibrator, wherein the vibrator is operatively coupled to the filter holding assembly and configured to vibrate the vibrating plate and thus vibrate the filter;
    providing a nozzle module for delivering pulsating, compressed air over substantially 360° to an interior surface of the filter;
    reciprocating the nozzle module along a longitudinal axis of the filter; and
    vacuuming contaminants that are dislodged from the filter.

18. The method of cleaning a filter according to claim 17, wherein the bottom support plate is a spring loaded bottom support plate and further comprising the step of detecting the deflection of the spring loaded bottom support plate using a photo eye sensor and determining the amount of pressure placed on the filter.

19. The method of cleaning a filter according to claim 17, further comprising monitoring the performance of the filter cleaning apparatus by using a vacuum air sensor to detect airflow and levels of particulate matter being vacuumed from the cleaning chamber.

* * * * *